US006996682B1

(12) United States Patent  (10) Patent No.: US 6,996,682 B1
Milligan et al.  (45) Date of Patent: Feb. 7, 2006

(54) SYSTEM AND METHOD FOR CASCADING DATA UPDATES THROUGH A VIRTUAL COPY HIERARCHY

(75) Inventors: Charles A. Milligan, Golden, CO (US); Thomas Nelson Noland, Louisville, CO (US); Leslie K. Hodge, Westminster, CO (US)

(73) Assignee: Storage Technology Corporation, Louisville, CO (US)

( * ) Notice: Subject to any disclaimer, the term of this patent is extended or adjusted under 35 U.S.C. 154(b) by 455 days.

(21) Appl. No.: 10/330,977

(22) Filed: Dec. 27, 2002

(51) Int. Cl.
  *G06F 12/00* (2006.01)
(52) U.S. Cl. ............... 711/141; 711/154; 711/203; 711/221; 707/100; 707/201; 707/203
(58) Field of Classification Search ................ 711/141, 711/154, 203, 221; 707/100, 201, 203
  See application file for complete search history.

(56) References Cited

U.S. PATENT DOCUMENTS

| | | | | |
|---|---|---|---|---|
| 4,965,719 | A | 10/1990 | Shoens et al. ............... | 364/200 |
| 5,403,639 | A * | 4/1995 | Belsan et al. ............... | 707/204 |
| 6,209,002 | B1 * | 3/2001 | Gagne et al. ............... | 707/204 |
| 6,477,544 | B1 * | 11/2002 | Bolosky et al. ............. | 707/200 |
| 6,539,381 | B1 * | 3/2003 | Prasad et al. ................. | 707/10 |
| 6,665,675 | B1 | 12/2003 | Mitaru ......................... | 707/10 |
| 6,779,016 | B1 | 8/2004 | Aziz et al. ................... | 709/201 |
| 6,779,094 | B2 * | 8/2004 | Selkirk et al. .............. | 711/165 |
| 6,779,095 | B2 * | 8/2004 | Selkirk et al. .............. | 711/165 |
| 6,801,949 | B1 | 10/2004 | Bruck et al. ................ | 709/232 |
| 6,804,755 | B2 * | 10/2004 | Selkirk et al. .............. | 711/165 |
| 2002/0053009 | A1 * | 5/2002 | Selkirk et al. .............. | 711/162 |
| 2002/0069369 | A1 | 6/2002 | Tremain ...................... | 713/201 |
| 2002/0091872 | A1 | 7/2002 | Bourke-Dunphy et al. . | 709/316 |
| 2002/0120660 | A1 | 8/2002 | Hay et al. ................... | 709/100 |
| 2002/0178335 | A1 * | 11/2002 | Selkirk et al. .............. | 711/162 |
| 2003/0005248 | A1 * | 1/2003 | Selkirk et al. .............. | 711/165 |
| 2003/0217131 | A1 | 11/2003 | Hodge et al. | |
| 2004/0128269 | A1 | 7/2004 | Milligan et al. | |

OTHER PUBLICATIONS

U.S. Appl. No. 10/150,174, Noland et al., Workload Balancing Using Dynamically Allocated Virtual Servers, May 17, 2002.
U.S. Appl. No. 10/179,557, Milligan et al., Apparatus and Method for Customization of Environments Using Incremental Changes to Metadata, Jun. 25, 2002.
U.S. Appl. No. 10/307,797, Milligan et al., Independent Distributed Metadata System and Method, Dec. 2, 2002.

* cited by examiner

*Primary Examiner*—Stephen C. Elmore
(74) *Attorney, Agent, or Firm*—Yee & Associates, P.C.

(57) ABSTRACT

A system and method for managing data updates by cascading those updates through a virtual copy hierarchy from parent copies to child copies are provided. Virtual copies are created and managed through the use of an instant copy mechanism. Metadata subsets manage both the original data and the copies created by the instant copy mechanism. With an exemplary embodiment of the system and method, changes made to one copy of the data are cascaded to all child copies of the data. In this paradigm not only is the metadata entry for one particular copy changed, but also the corresponding metadata entries of any copies descended from that copy. In an exemplary method, a tree structure is used to maintain a record of all metadata table subsets created by use of an instant copy method. The tree structure can then be searched to find all child copies of a particular copy.

17 Claims, 6 Drawing Sheets

SYSTEM AND METHOD FOR CASCADING DATA UPDATES THROUGH A VIRTUAL COPY HIERARCHY

RELATED APPLICATIONS

The present application is related to commonly assigned and copending U.S. patent application entitled "WORKLOAD BALANCING USING DYNAMICALLY ALLOCATED VIRTUAL SERVERS," Ser. No. 10/150,174, which is currently pending, and U.S. patent application entitled "PROCESSING DISTRIBUTION USING INSTANT COPY," Ser. No. 10/147,831, which is currently pending both of which filed on May 17, 2002, U.S. patent application entitled "APPARATUS AND METHOD FOR INSTANT COPY OF DATA," Ser. No. 09/884,822, which has been issued as U.S. Pat. No. 6,779,095, and U.S. patent application entitled "APPARATUS AND METHOD FOR INSTANT COPY OF DATA IN A DYNAMICALLY CHANGEABLE VIRTUAL MAPPING ENVIRONMENT," Ser. No. 09/884,687, which has been issued as U.S. Pat. No. 6,779,094, both of which filed on Jun. 19, 2001, U.S. patent application entitled "APPARATUS AND METHOD FOR CUSTOMIZATION OF ENVIRONMENTS USING INCREMENTAL CHANGES TO METADATA," Ser. No. 10/179,557, which is currently pending, filed on Jun. 25, 2002, U.S. patent application Ser. No. 10/307,797, which is currently pending, entitled "INDEPENDENT DISTRIBUTED METADATA SYSTEM AND METHOD," filed on Dec. 2, 2002, and U.S. patent application Ser. No. 10/330,875 which is currently pending, entitled "SYSTEM AND METHOD FOR MANAGING DATA THROUGH FAMILIES OF INTER-RELATED METADATA TABLES," filed on Dec. 27, 2002, all of the above applications being hereby incorporated by reference.

BACKGROUND OF THE INVENTION

1. Technical Field

The present invention provides a system and method for managing data updates in a hierarchy of virtual copies of data. More specifically, the present invention provides a mechanism for cascading changes to a data track to child copies of metadata pointing to the changed data track.

2. Description of Related Art

In known storage subsystems that make use of instant copy operations, such as the Snapshot instant copy mechanism available from Storage Technology, Inc., data files are received from a processor and stored in back-end data storage devices by mapping the processor assigned data file identifier to a logical address that identifies the physical storage location of the data. This mapping allows instant copies of data files by creating duplicate data file pointers that reference the original data files. In this dynamically mapped virtual data storage system, the data files are referred to as a collection of "virtual tracks" and each data file is identified by unique virtual track addresses (VTAs). More information about the Snapshot instant copy mechanism may be found in the incorporated U.S. patent application Ser. No. 09/884,822 entitled "APPARATUS AND METHOD FOR INSTANT COPY OF DATA."

Using an instant copy mechanism, such as the Snapshot instant copy mechanism, may result in many copies of the same set of metadata entries, i.e. a subset of the metadata table, being used in a storage subsystem. It is useful to manage these various copies of the metadata so that changes to data tracks associated with metadata entries are passed along to appropriate copies of the metadata. Thus, it would be beneficial to have a system and method for managing data updates in systems where virtual copies of data are created through an instant copy operation.

SUMMARY OF THE INVENTION

The present invention provides a system and method for managing data updates by cascading those updates through a virtual copy hierarchy from parent copies to child copies. In an exemplary embodiment of the present invention, a data structure is maintained for keeping track of which copies of metadata are dependent from other copies of metadata, i.e. which copies are parent copies of metadata and which copies are child copies of metadata. This data structure is a tree data structure in which nodes of the tree are copies of metadata and arcs connect parent nodes to child nodes.

The metadata may consist of offsets, pointers, bitmaps, timestamps, file sizes, and/or other information. The key feature for the purposes of the present invention is that the metadata can be used to derive the physical location on the storage device of its associated data. This may be a track, cylinder, or other unit of storage on a storage medium. The metadata may indicate the size or granularity of the physical unit of storage as well as the number of consecutive physical units of storage used to store the data.

In the apparatus and method of the present invention, a metadata table is used to reference the physical locations of data. As instant copies are created, subsets of the metadata table are copied and then stored as new entries in the table. Once a copy is made, it too may be copied. Thus "A" may be a copy of the original data. "B" may be a copy of "A". "C" may be a copy of "B", and so on. If "B" is a copy of "A" then "B" would be called a child copy of "A". Similarly, "C" would be considered a descendent copy of "A" and a child copy of "B".

Each of these copies would have associated with it a subset of the metadata table. If no changes were made to the data while the copies are being created then the corresponding entries of these metadata table subsets would point to the same physical data location (i.e. track on a disk drive). Thus the first metadata entry of each subset would all point to the same track on the disk drive.

When it is desirable to update a portion of a dataset, the subset of the metadata table associated with the dataset copy is accessed, and the physical address of the track (or other unit of storage) is found from the metadata entry associated with the file descriptor for the portion of the dataset.

In the Snapshot instant copy mechanism (U.S. patent application Ser. No. 09/884,822 entitled "APPARATUS AND METHOD FOR INSTANT COPY OF DATA") a copy of the track is created at a new location on the storage device. The metadata entry is modified to point to the copy of the track and then the data on the copy of the track is changed. In this manner each of the other dataset copies still have their metadata entries pointing to the original track and therefore, are unaffected by the file update of this dataset copy.

The present invention provides for an adaptation of this technique. Instead of changing only the one metadata entry to point to the copy of the track, the present invention changes the corresponding metadata entries of all the child and descendent copies to point to the copy of the track. Thereafter, the portion of the data set is updated in the copy of the track. This will result in the original dataset copy having an updated portion of the dataset and all its child and descendent copies also having an updated portion of the dataset.

For example, if there is a file "logo.gif" that is a picture of a red circle and copy "B" changes that file to a picture of a blue square, then with the present invention, anyone working with the original data or copy "A" would still see a red circle, while anyone working with copy "B" or copy "C" would now see a blue square. This invention "cascades" data changes down through the copy hierarchy.

It should be noted that only the child metadata tables are modified to be consistent with the metadata table that was modified. Any metadata tables that are parents of the modified metadata table are not changed. Thus, the change to the data is only cascaded down the tree data structure from the modified metadata table to each of its child metadata tables.

These and other features and advantages of the present invention will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENTS

The present invention describes a method for managing data through the use of metadata. The present invention may be implemented in a stand alone computing device or in a distributed computing environment, such as a network.

Figure 1:
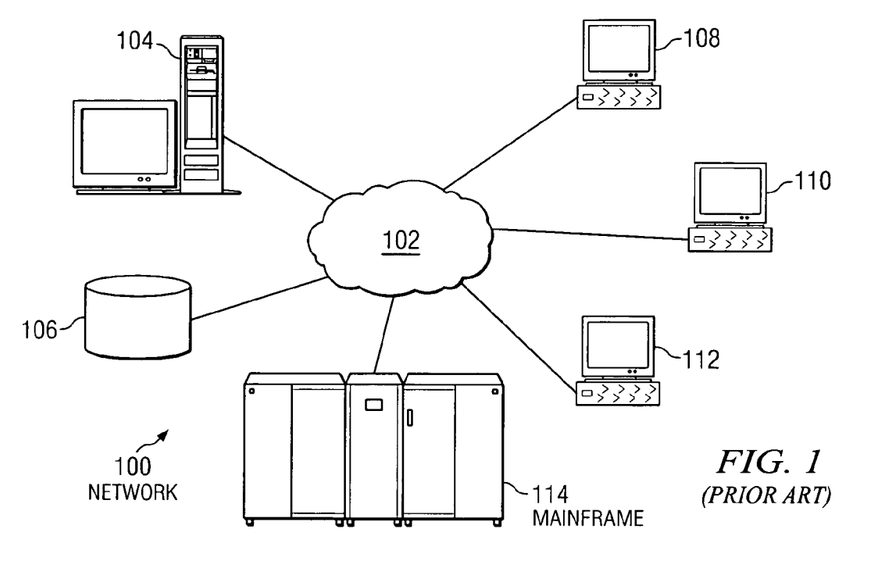
FIG. 1 is an exemplary block diagram of a network computing environment in which the present invention may be implemented.
Figure 2:
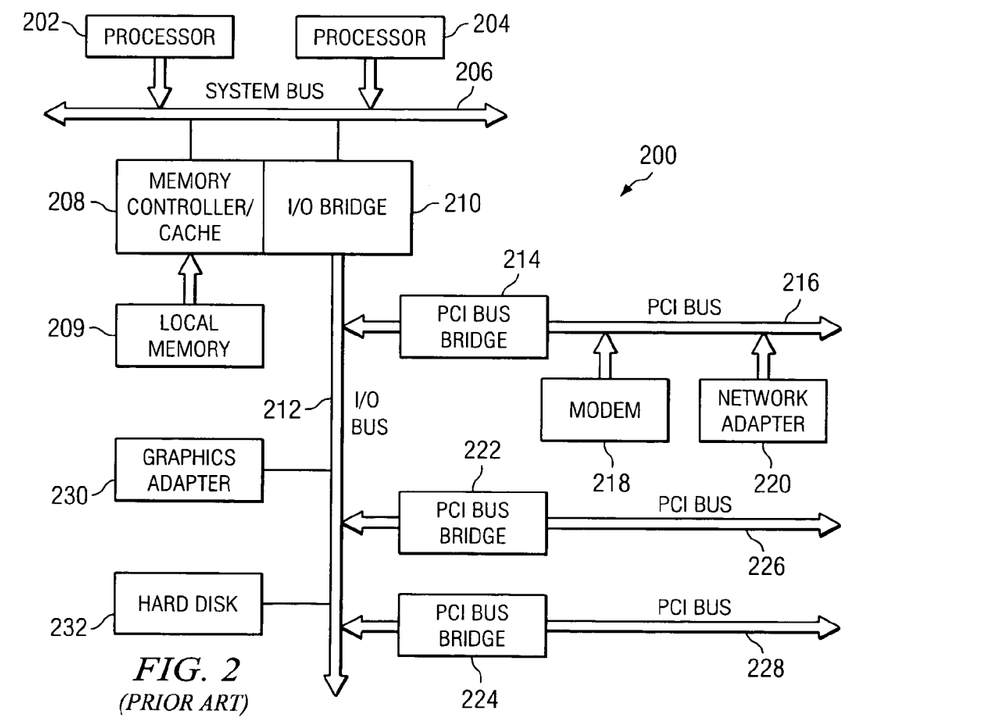
FIG. 2 is an exemplary block diagram of a storage subsystem in accordance with a preferred embodiment of the present invention.
Figure 3:
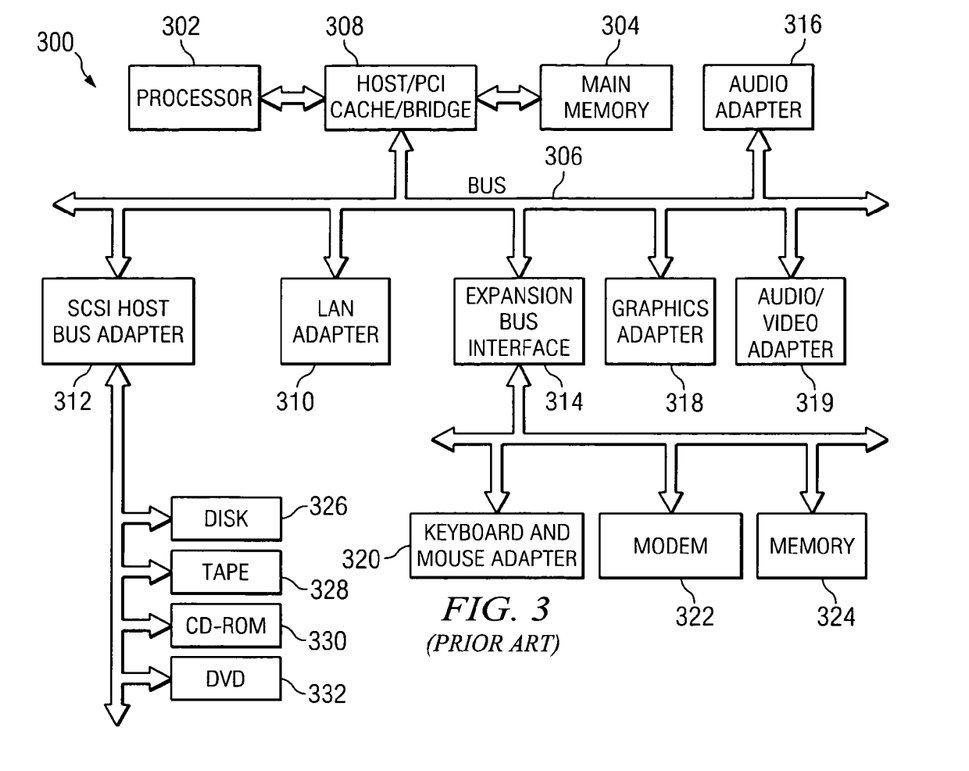
FIG. 3 is an exemplary diagram illustrating a client device in which the present invention may be implemented.

FIGS. 1–3 illustrated a distributed computing environment in which the present invention may be implemented. It should be noted that, in a stand alone computing device embodiment of the present invention, the present invention may be implemented in either the server computing device shown in FIG. 2 or the client computing device shown in FIG. 3, independent of the other computing devices in the distributed data processing system.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, a server 104 is connected to network 102 along with mainframe 114 and storage unit 106. In addition, clients 108, 110, and 112 also are connected to network 102. These clients 108, 110, and 112 may be, for example, personal computers or network computers. In the depicted example, server 104 and mainframe 114 may provide data, such as boot files, operating system images, and applications to clients 108–112. In addition, mainframe 114 may host one or several virtual servers. Clients 108, 110, and 112 are clients to server 104 and mainframe 114. Network data processing system 100 may also include additional servers, clients, and other devices not shown (e.g., printers).

In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component, interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary and could indeed be a mainframe architecture rather than the depicted architecture. In addition, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an eServer pSeries system, a product of International Business Machines Corporation in Armonk, N.Y., running the Advanced Interactive Executive (AIX) or Linux operating systems.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

As discussed previously, the present invention, in one exemplary embodiment, provides a mechanism for managing data updates by cascading those updates through a virtual copy hierarchy from parent copies to child copies. In this exemplary embodiment, a data structure is maintained for keeping track of which copies of metadata tables are dependent from other copies of metadata tables, i.e. which copies are parent copies of metadata tables and which copies are child copies of metadata tables. This data structure is a tree data structure in which nodes of the tree are copies of metadata tables and arcs connect parent nodes to child nodes.

In the apparatus and method of the present invention, metadata tables are used to reference the physical locations of data. By changing an entry in a metadata table, different data will be accessed.

Figure 4:
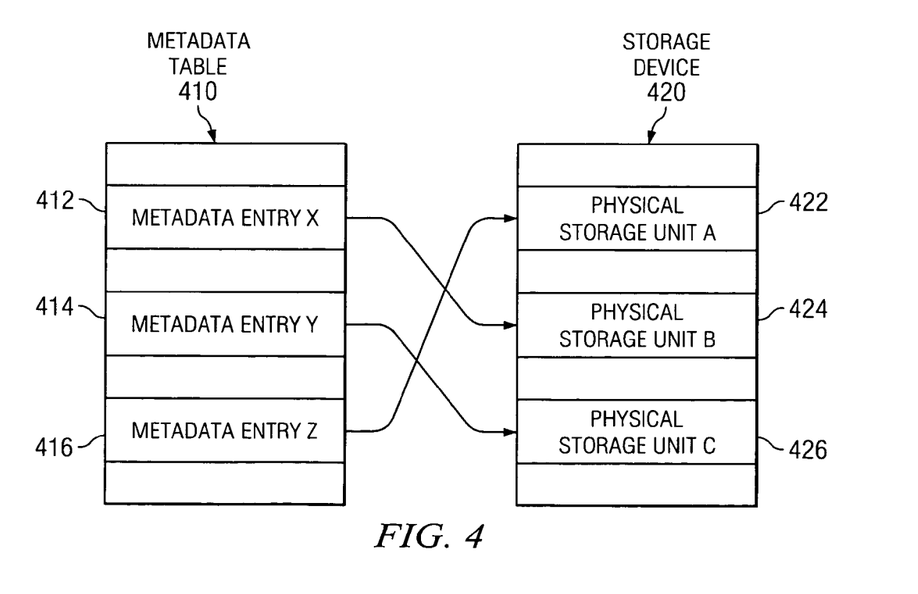
FIG. 4 is an exemplary diagram illustrating metadata table-storage device model used with the present invention.

FIG. 4 exemplifies the metadata table-data storage model used in the present invention. As shown in FIG. 4, the metadata table 410 includes a plurality of entries 412–416 that point to physical locations 422–426 of a storage device 420 where data corresponding to the metadata table entries 412–416 is located. The metadata may consist of offsets, pointers, bitmaps, timestamps, file sizes, and/or other information. The key feature for the purposes of the present invention is that the metadata can be used to derive the physical location on the storage device of its associated data. This may be a track, cylinder, or other unit of storage on a magnetic tape storage medium, magnetic disk storage medium, optical storage medium, removable storage medium, memory, or the like. The metadata may also indicate the size or granularity of the physical unit of storage along with the number of sequential units involved in the storage of the desired information.

In a preferred embodiment, the metadata tables include pointers to units of storage of a predetermined size, such as tracks on a disk drive in a storage subsystem. When a calling application wishes to access data on the storage device 420, the calling application looks up the metadata corresponding to the files it requires in the metadata table 410. From the metadata in the metadata table 410, the calling application identifies the addresses of the tracks on which the files reside in the storage device 420 and reads the data from the tracks of the storage device 420.

The metadata table 410 may be obtained, for example, using an instant copy operation or the like. An exemplary instant copy operation is described in U.S. patent application Ser. No. 09/884,822, entitled "Apparatus and Method for Instant Copy of Data." An instant copy mechanism of this type may either be used as described in the above patent, or may be augmented in such a manner so as to provide additional information for each entry in the metadata table. It should be noted that the term "metadata table" as it is used herein may be either an entire metadata table data structure, such as metadata table 410, or may be a subset of a larger metadata table.

Figure 5:
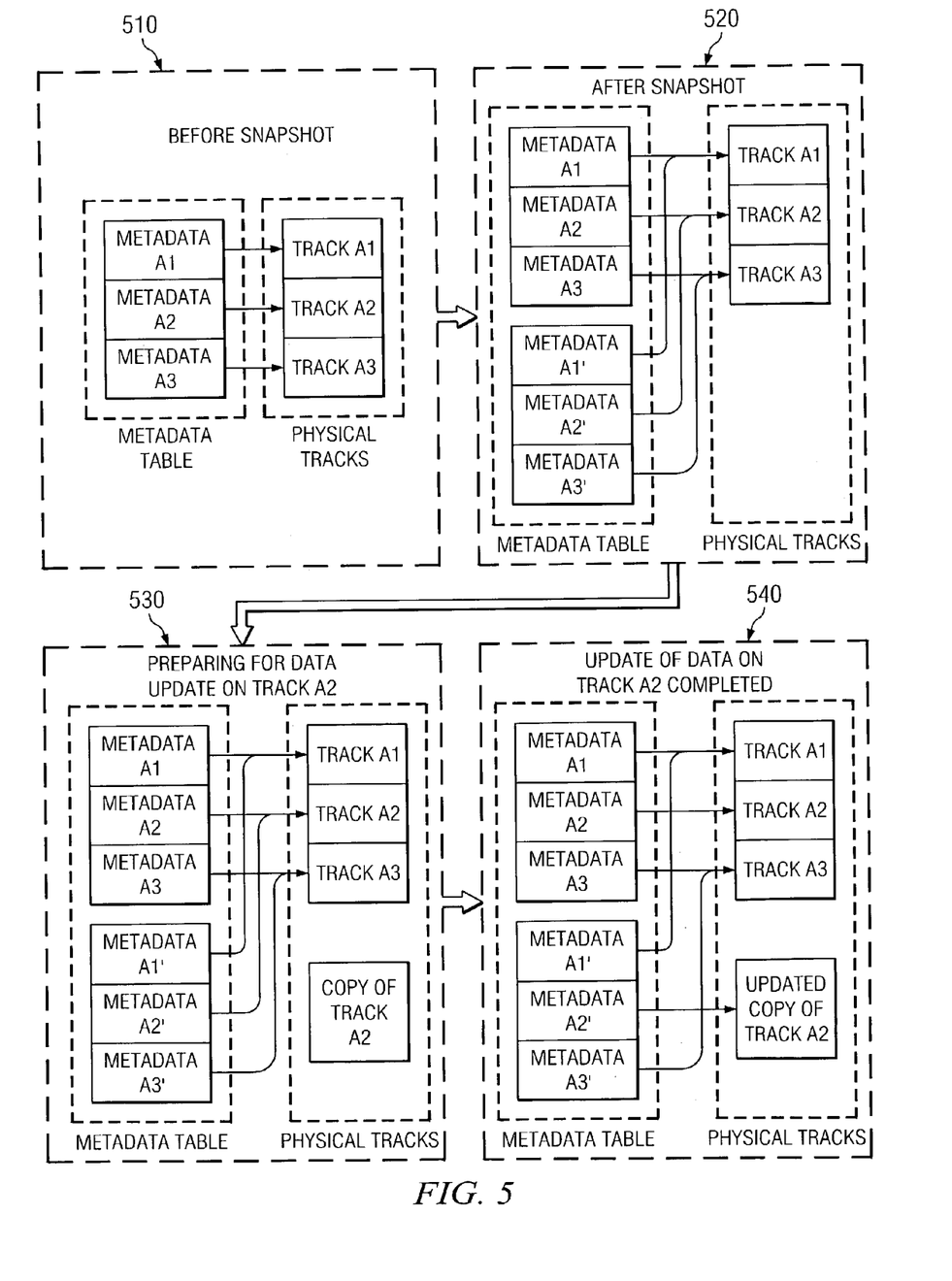
FIG. 5 is an exemplary diagram illustrating an instant copy operation according to the present invention.

FIG. 5 is an exemplary diagram illustrating an example instant copy and data change operation that may be used with the present invention. As shown in FIG. 5, during a first phase 510 of the instant copy operation, metadata entries A1–A3 in the metadata table point to data tracks A1–A3. In a second phase 520, an instant copy of the data tracks is generated by creating a virtual copy of the data tracks. This virtual copy of the data tracks A1–A3 is comprised of a copy of the metadata A1–A3 which is denoted as A1'–A3'. Thus, to a user or application making use of the present invention, two versions of the same data appear to exist, but in actuality only one version of the data exists with two sets of metadata entries pointing to the same physical data tracks.

Thereafter, in a third phase 530, a copy of the data track A2 whose data is to be changed is made in preparation for the changes to the data. The changes to the data will be made to the copy of data track A2 rather than to the original data track A2. Following copying of the data track A2, the copy of the metadata, i.e. metadata entry A2' is modified to point to the copy of the data track which is updated or changed to reflect the new data. Thus, the second set of metadata A1'–A3' is comprised of metadata entries A1' and A3' which point to the original tracks A1 and A3. The second set of metadata further includes metadata entry A2' which now points to the updated copy of track A2. Thus, when a user or application accesses the data in the physical tracks using the set of metadata A1–A3, the data tracks A1–A3 are accessed. When a user or application accesses the data in the physical tracks using the set of metadata A1'–A3', the data tracks A1, A3 and the updated copy of track A2 are accessed.

The set of metadata entries A1–A3 and the set of metadata entries A1'–A3' are referred to herein as metadata tables. With the present invention, there may be multiple copies of a metadata table in the same or different physical locations. That is, copies of a metadata table may be resident on the same computing device or may be distributed to computing devices in a distributed data processing system independently of the data stored in storage device. Users of the computing devices to which the copies of the metadata table are distributed may use these copies of metadata table to generate local data sets, generate new computing environments, or even change the data in the storage device. Thus, with a plurality of independent copies of a metadata table and the ability to change the data stored in the storage device using an instant copy operation, for example, there is the possibility that changes to data using a first copy of metadata may not be passed along to copies of the first copy of metadata without the aide of an additional mechanism for ensuring consistency among parent and child copies of the metadata. In other words, some child copies of the first metadata table 410 may point to physical locations 422–426 while the first metadata table 410 has been changed to point to different physical locations of the storage device 420 or another storage device.

As an example of how to address this problem, the present invention provides a mechanism for keeping track of the hierarchy of virtual copies of data, i.e. metadata tables. In a preferred embodiment, this mechanism takes the form of a tree data structure. In an alternative embodiment, this mechanism may be using linked lists in which each metadata table subset created by an instant copy method may have a reference to a linked list of pointers to the start of any metadata table subsets created of a child copy. The present invention further provides mechanisms for using these data structures to ensure updates to data are passed along from a parent copy of a metadata table to each of its child copies of the metadata table. The preferred embodiments of the present invention will be described in terms of a tree data structure being used to track copies of metadata, however it should be evident to those of ordinary skill in the art, in view of the present description, how the principles of linked lists may be used in place of the tree data structure of the present invention to manage copies of metadata.

Figure 6:
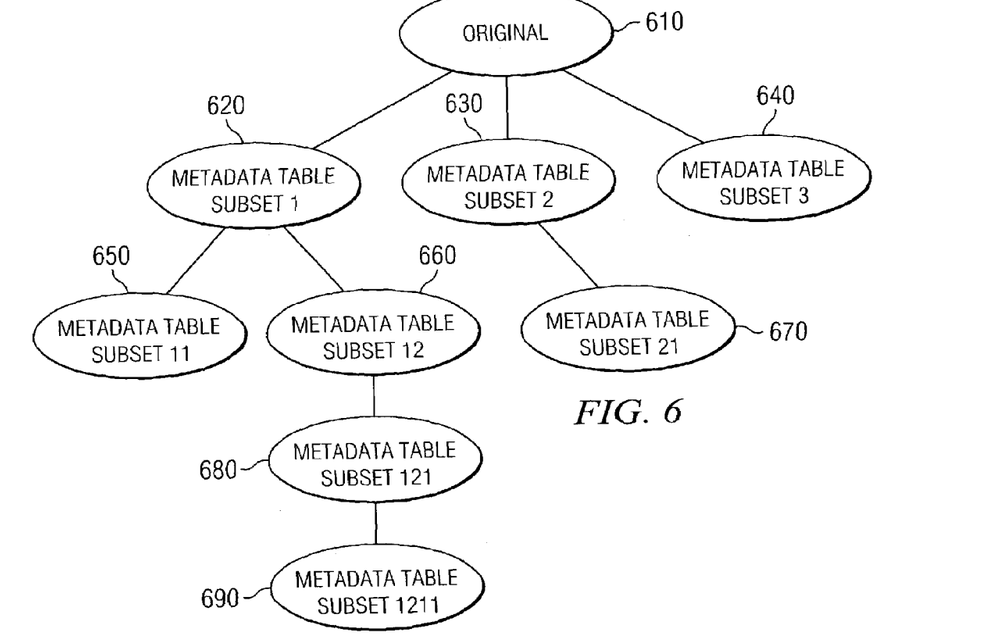
FIG. 6 is an exemplary diagram illustrating a tree data structure according to the present invention.

FIG. 6 illustrates an exemplary tree data structure according to one embodiment of the present invention. As shown in FIG. 6, an original metadata table 610 serves as a root node of the tree data structure. From this original metadata table 610, copies of the metadata table 610 have been made using an instant copy operation. These copies are denoted metadata table subset 1 (620), metadata table subset 2 (630) and metadata table subset 3 (640). Thus, with original metadata table 610 and the copies 620–640, at a user or application level there appears to be four exact copies of the data pointed to by the original metadata table 610. Each of these various copies of the metadata may be used to access the data stored in the physical locations referenced by the original metadata table 610. As such, any one of these copies of the metadata table may be used to modify data stored in the physical locations by copying the data to a new location, updating the pointers of the copy of the metadata to point to the new data location, and then updating the data.

Copies of metadata table subset 1 (620) have also been made. These copies of metadata table subset 1 are denoted metadata table subset 11 (650) and metadata table subset 12 (660). Similarly, a copy of metadata table subset 2 (630) has been created and is denoted metadata table subset 21 (670). The metadata table subset 12 (660), in turn has a copy of it created and denoted metadata table 121 (680) which itself, has a copy denoted metadata table subset 1211 (690).

The metadata table subset 1 (620) is a child of the original metadata table 610 and is a parent to each of metadata table subsets 650–660 and 680–690. Similarly, metadata table subset 2 (630) is a child of the original metadata table 610 and is a parent to metadata table subset 21 (670).

A data structure representing this tree structure is stored in association with the present invention for use in determining how to propagate changes made to data using one metadata table subset to each of its child metadata table subsets. Using the data structure of this exemplary mechanism, if a change to data in a physical storage location is to be made using a first copy of metadata, such as metadata table subset 12 (660), the data is copied to a new physical storage location, the metadata table subset 12 (660) is updated to point to this new physical storage location, and the data in the new physical storage location is updated.

Thereafter, a check of the data structure of the present invention is performed to determine if there are any child copies of the metadata table (660) that was used to perform the change to the data. In the specific example shown in FIG. 6, by performing this check of the data structure, metadata table subsets 121 (680) and 1211 (690) are identified as being child copies of metadata table subset 12 (660). Thus, functions are performed to update the copies of the metadata table 680 and 690 so that they point to the new physical storage location where the data has be updated. In this way, the copy of metadata used to perform the data change and any child copies of this metadata are kept consistent with one another until changes are made directly to the child copies of the metadata table.

It should be noted that changes to data in physical storage locations and the resulting changes to the metadata are only cascaded down the tree structure from the source node, i.e. the node used to facilitate the change to the data, to each child of the source node. There is no propagation of the changes up the tree data structure.

Figure 7:
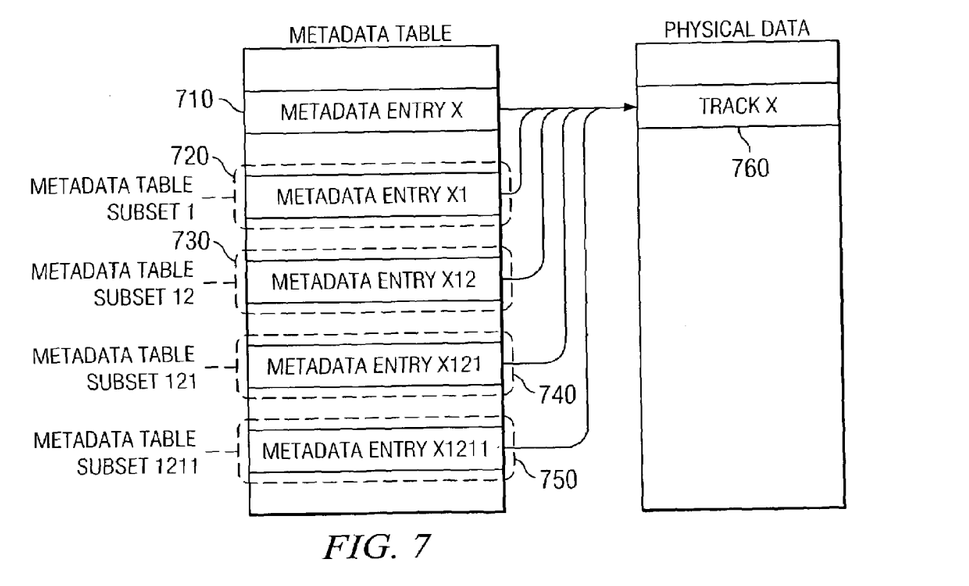
FIG. 7 is an exemplary diagram illustrating a set of metadata tables prior to update of a data track using the mechanisms of the present invention.
Figure 8:
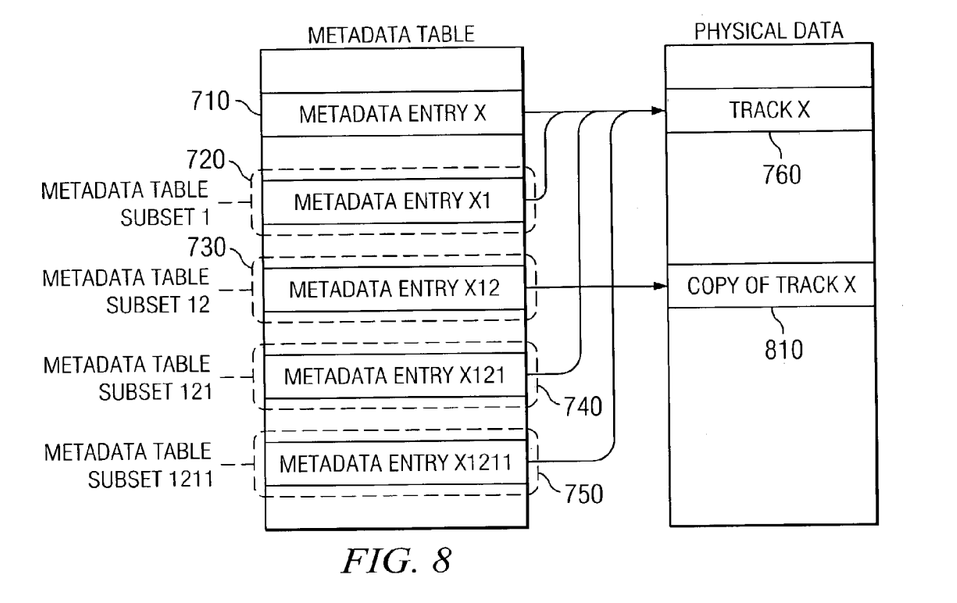
FIG. 8 is an exemplary diagram illustrating the set of metadata tables of FIG. 7 after copying of a data track in preparation for changing the data in the data track.
Figure 9:
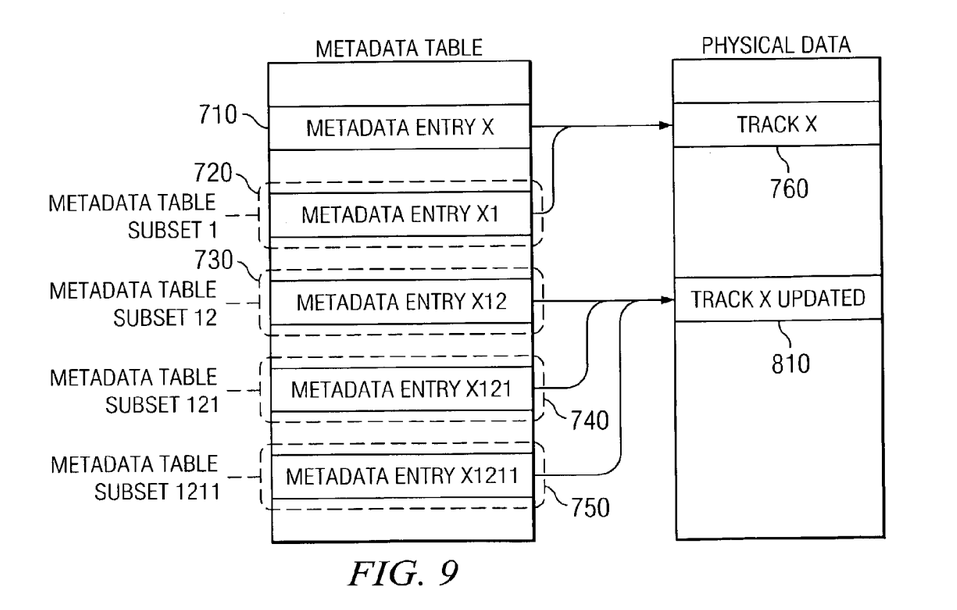
FIG. 9 is an exemplary diagram illustrating the set of metadata tables of FIG. 7 following cascading of the modification to a metadata table according to the present invention.

FIGS. 7–9 are exemplary diagrams illustrating the various stages of performing a change to data in a system that makes use of virtual copies of data. More specifically, in a preferred embodiment, the virtual copies of data are created by performing an instant copy operation on metadata associated with the data in the physical data storage locations. As is shown in FIGS. 7–9, the present invention provides a mechanism for ensuring that modifications using these instant copies of metadata are cascaded down the hierarchy of copies of metadata from parent copies to child copies.

FIG. 7 is an exemplary diagram illustrating a set of metadata tables prior to update of a data track using the mechanisms of the present invention. As shown in FIG. 7, an original metadata entry 710 points to data stored in the physical storage location track X 760. A copy 720 of the original metadata entry X 760 is created using an instant copy operation, for example. Since there has been no change to the data stored in the physical storage device, the copy 720 also points to the data stored in track X 760.

A copy 730 of the copy 720 is created using an instant copy operation and also points to the data at track X 760. This same operation is performed for metadata entries 740 and 750 where metadata entry 740 is a copy of metadata entry 730 and metadata entry 750 is a copy of metadata entry 740. Each of these copies of metadata entries resides in its own metadata table subset. That is, these metadata entries may be copied together with other metadata entries as a set using an instant copy operation. Each of these subsets may, in themselves, be considered a "metadata table" and may be distributed to other computing devices in a distributed data processing system independently of the data in the physical storage device.

FIG. 8 is an exemplary diagram illustrating the set of metadata tables of FIG. 7 after copying of a data track in preparation for changing the data in the data track. As shown in FIG. 8, in preparation for changing the data in track X 760, a copy 810 of the data at track X 760 is created and stored in a different physical location of the physical storage device. This is because the intended change to the data of track Z 760 will in fact be made to the copy 810 of the data in track X. Once the data has been copied to a new physical location of storage, the metadata that is being used to change the data of track X, namely metadata entry 730 of metadata table subset 12, is modified to point to this new physical location. Following modification of the metadata entry 730 to point to this new physical location, the data of the copy of track X 810 may be modified as desired by the user or application accessing the data using metadata entry 730.

In known systems, with the modification of the data in the copy of track X 810, the update operation using an instant copy of metadata is complete. As a result, metadata entry 730 differs from its child metadata entries 740 and 750. With the present invention, however, a mechanism is provided to ensure that the child metadata entries 740 and 750 are updated to be consistent with the change to their parent metadata entry 730.

With the mechanism of the present invention, hierarchical data structure, which in preferred embodiments is a tree data structure as discussed above, is accessed to determine if there are any copies of metadata entry 730. If so, these copies are identified and a determination is made as to whether these copies also have copies of themselves that were created. This process continues until there are no more child copies of metadata identified in the hierarchical data structure. Then, each of these identified child copies are modified to be consistent with the modifications to metadata entry 730. In a stand alone computing device, such modification may simply be identifying the location of these child copies in the metadata table and modifying their attributes to point to the data at physical storage location 810. In a distributed computing environment, such modification may involve sending instructions to other computing devices, identified in the hierarchical data structure, instructing them to update their local copy of the metadata entry.

FIG. 9 is an exemplary diagram illustrating the set of metadata tables of FIG. 7 following cascading of the modification to a metadata table according to the present invention. As shown in FIG. 9, based on a check of the hierarchical data structure, metadata entries 740 and 750 are identified as child copies of metadata entry 730. These metadata entries 740 and 750 are modified to be consistent with the modified metadata entry 730. Thus, as shown in FIG. 9, the modified versions of metadata entries 740 and 750 point to the updated data in the new physical storage location 810.

Figure 10:
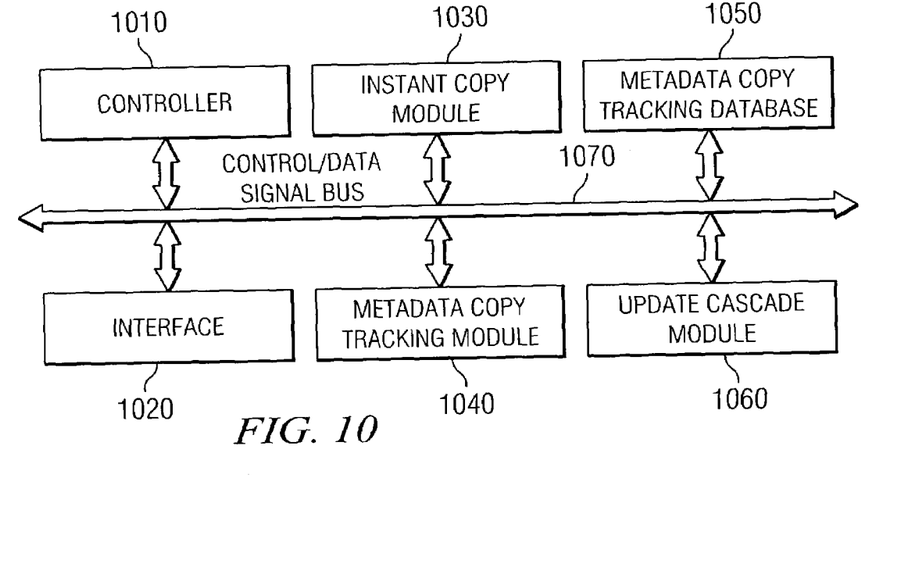
FIG. 10 is an exemplary block diagram of a system for performing cascading of data updates through a virtual copy hierarchy.

FIG. 10 is an exemplary block diagram of a system for performing cascading of data updates through a virtual copy hierarchy according to the present invention. The elements shown in FIG. 10 may be implemented as software, hardware or any combination of software and hardware. In a preferred embodiment, the elements in FIG. 10 are implemented as software instructions executed by one or more data processing devices.

As shown in FIG. 10, the exemplary system of the present invention includes a controller 1010, an interface 1020, an instant copy module 1030, a metadata copy tracking module 1040, a metadata copy tracking database 1050, and an update cascade module 1060. The elements 1010–1060 are in communication with one another via the control/data signal bus 1070. Although a bus architecture is shown in FIG. 10, the present invention is not limited to such and any architecture that facilitates the communication of control/data signals may between the elements 1010–1060 may be used without departing from the spirit and scope of the present invention.

Controller 1010 controls the overall operation of the system and orchestrates the operation of the other elements 1020–1060. Interface 1020 provides a communication interface between the system and the storage subsystem and/or a client system. The instant copy module 1030 performs the functions of instant copy operations on metadata and data stored in physical storage locations in a storage subsystem.

Metadata copy tracking module 1040 performs the operations for tracking copies of metadata as they are created. The metadata copy tracking module 1040 identifies when a copy of meta data is created, for example through an event/listener type mechanism, and stores information about the copy of the metadata created in the metadata copy tracking database 1050. Such information may include an identification of the parent copy of the metadata, identification of a location of the new copy of metadata, any child copies of this metadata that are created, and the like.

The update cascade module 1060 performs the functions for updating child copies of metadata based on an update to a parent copy of metadata. The update cascade module 1060 may interface with the metadata copy tracking module 1040 and/or the metadata copy tracking database 1050 to identify child copies of metadata and to retrieve information about storage locations of these child copies of metadata. The update cascade module 1060 may then issue instructions, or interface with instant copy module 1030, to update these child copies of metadata to be consistent with their modified parent copy of metadata.

Figure 11:
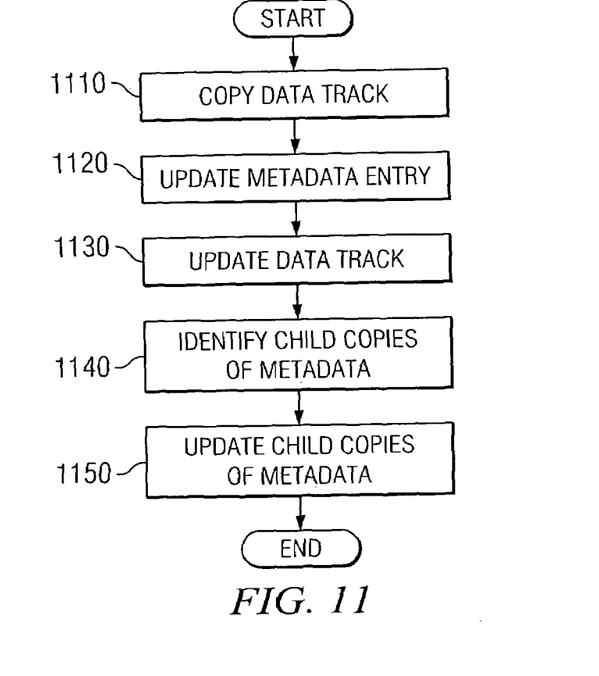
FIG. 11 is a flowchart outlining an exemplary operation of the present invention.

FIG. 11 is a flowchart outlining an exemplary operation of the present invention. As shown in FIG. 11, the operation starts with a data track being copied (step 1110). The metadata entry that is being used to modify the data is then updated to point to the copy of the data track (step 1120). The data is then updated in the copy of the data track (step 1130) and any child copies of the metadata are identified (step 1140). These child copies of metadata are then updated to be consistent with the changes to the parent copy of the metadata in step 1120 (step 1150). The operation then ends.

Thus, the present invention provides a mechanism for ensuring that changes to metadata are passed along to any child copies of this metadata. As a result, the hierarchy of copies of metadata is extended to apply to modifications of copies of metadata such that any changes to a parent copy of metadata are reflected in each child copy of that metadata.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, and DVD-ROMs. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for updating metadata in a hierarchy of copies of metadata, comprising:
   updating a first copy of metadata;
   identifying a second copy of metadata that is a child copy of the first copy of metadata;
   updating the second copy of metadata, in response to the updating of the first copy of metadata, to be consistent with the update to the first copy of metadata; and
   wherein the first copy of metadata has a parent copy of metadata, and wherein the parent copy of metadata is not updated in response to the updating of the first copy of metadata.

2. The method of claim 1, wherein updating the first copy of metadata is performed in response to a request to modify data in a physical data storage location.

3. The method of claim 2, wherein updating the first copy of metadata includes:
   copying the data in the physical data storage location to a new physical data storage location; and
   modifying the first copy of metadata to point to the new physical data storage location.

4. The method of claim 3, wherein updating the second copy of metadata includes modifying the second copy of metadata to point to the new physical data storage location.

5. The method of claim 1, wherein identifying a second copy of metadata that is a child copy of the first copy of metadata includes accessing a hierarchical data structure used to track copies of metadata.

6. The method of claim 5, wherein the hierarchical data structure stores information about copies of metadata including whether the copy of metadata is a parent to another copy of metadata and whether the copy of metadata is a child of another copy of metadata.

7. The method of claim 6, wherein the hierarchical data structure further stores information regarding the location of each copy of metadata.

8. The method of claim 1, wherein the second copy of metadata is an instant copy of the first copy of metadata.

9. A computer program product stored on a computer readable medium for updating metadata in a hierarchy of copies of metadata, comprising:
   first instructions for updating a first copy of metadata;
   second instructions for identifying a second copy of metadata that is a child copy of the first copy of metadata;
   third instructions for updating the second copy of metadata, in response to the updating of the first copy of metadata, to be consistent with the update to the first copy of metadata; and
   wherein the first copy of metadata has a parent copy of metadata, and wherein the parent copy of metadata is not updated in response to the updating of the first copy of metadata.

10. The computer program product of claim 9, wherein the first instructions for updating the first copy of metadata include:
    instructions for copying the data in the physical data storage location to a new physical data storage location; and
    instructions for modifying the first copy of metadata to point to the new physical data storage location.

11. The computer program product of claim 10, wherein the third instructions for updating the second copy of metadata include instructions for modifying the second copy of metadata to point to the new physical data storage location.

12. The computer program product of claim 9, wherein the second instructions for identifying a second copy of metadata that is a child copy of the first copy of metadata include instructions for accessing a hierarchical data structure used to track copies of metadata.

13. The computer program product of claim 12, wherein the hierarchical data structure stores information about copies of metadata including whether the copy of metadata is a parent to another copy of metadata and whether the copy of metadata is a child of another copy of metadata.

14. The computer program product of claim 13, wherein the hierarchical data structure further stores information regarding the location of each copy of metadata.

15. The computer program product of claim 14, wherein the location of each copy of metadata includes at least one location that is in a different device from the data processing system, and wherein the third instructions for updating the second copy of metadata include instructions for sending an instruction to the different device to update the second copy of metadata.

16. The computer program product of claim 9, wherein the second copy of metadata is an instant copy of the first copy of metadata.

17. An apparatus in a data processing system for updating metadata in a hierarchy of copies of metadata, comprising:

said data processing system including a processor executing code for updating a first copy of metadata;

a data structure for identifying a second copy of metadata that is a child copy of the first copy of metadata;

an update cascade module for updating the second copy of metadata, in response to the updating of the first copy of metadata, to be consistent with the update to the first copy of metadata; and wherein the first copy of metadata has a parent copy of metadata, and wherein the parent copy of metadata is not updated in response to the updating of the first copy of metadata.

\* \* \* \* \*